(12) United States Patent
Derouet (10) Patent No.: US 8,296,845 B2
(45) Date of Patent: Oct. 23, 2012

(54) INTEGRATED CIRCUITS INCLUDING REVERSE ENGINEERING DETECTION USING DIFFERENCES IN SIGNALS

(75) Inventor: Odile Derouet, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1218 days.

(21) Appl. No.: 12/052,427

(22) Filed: Mar. 20, 2008

(65) Prior Publication Data

US 2008/0244749 A1    Oct. 2, 2008

(30) Foreign Application Priority Data

Mar. 27, 2007 (KR) .......................... 10-2007-0029936

(51) Int. Cl.
*G06F 21/00* (2006.01)
(52) U.S. Cl. ............ 726/22; 726/34; 713/500; 713/501; 714/30
(58) Field of Classification Search .................. 713/172, 713/174, 194, 500, 501, 502, 503; 726/22, 726/23, 24, 25, 34; 380/2; 714/25, 30, 32, 714/48
See application file for complete search history.

(56) References Cited

U.S. PATENT DOCUMENTS

| | | | | |
|---|---|---|---|---|
| 6,496,119 | B1 * | 12/2002 | Otterstedt et al. ............ 340/653 |
| 6,962,294 | B2 * | 11/2005 | Beit-Grogger et al. ....... 235/492 |
| 2003/0132777 | A1 * | 7/2003 | Laackmann et al. .............. 326/1 |
| 2003/0218475 | A1 * | 11/2003 | Gammel ............................ 326/8 |
| 2005/0044403 | A1 * | 2/2005 | Kim ................................. 713/200 |
| 2005/0047047 | A1 * | 3/2005 | Matsuno ........................ 361/115 |
| 2005/0213757 | A1 * | 9/2005 | Kunemund ..................... 380/44 |
| 2007/0126100 | A1 * | 6/2007 | Mizuno et al. ................. 257/679 |
| 2007/0171099 | A1 * | 7/2007 | Kuenemund .................... 341/50 |
| 2007/0182575 | A1 * | 8/2007 | Kunemund .................... 340/635 |
| 2009/0001821 | A1 * | 1/2009 | Walker et al. ................. 307/413 |

FOREIGN PATENT DOCUMENTS

| | | |
|---|---|---|
| JP | 2005-072514 | 3/2005 |
| KR | 1020010016564 A | 3/2001 |
| KR | 1020030032016 A | 4/2003 |
| WO | WO-2007/091210 A2 * | 8/2007 |

* cited by examiner

*Primary Examiner* — Eleni Shiferaw
*Assistant Examiner* — Hilary Branske
(74) *Attorney, Agent, or Firm* — Myers Bigel Sibley & Sajovec, P.A.

(57) ABSTRACT

An active shield can be configured to receive a test signal, and configured to output a plurality of shield signals, derived from the test signal, via a plurality of signal paths. A compare logic can be configured to compare the test signal with each of the plurality of shield signals to provide at least two comparison signals indicating comparison results and can be configured to output the at least two comparison signals. A detection and decision logic can be configured to determine whether the active shield is subject to attack based on patterns of the at least two comparison signals.

9 Claims, 8 Drawing Sheets

Fig. 8

INTEGRATED CIRCUITS INCLUDING REVERSE ENGINEERING DETECTION USING DIFFERENCES IN SIGNALS

CROSS-REFERENCE TO RELATED APPLICATIONS

This U.S. non-provisional patent application claims priority under 35 U.S.C. §119 of Korean Patent Application No. 10-2007-0029936, filed on Mar. 27, 2007, the entire contents of which are hereby incorporated by reference.

FIELD OF THE INVENTION

The present invention disclosed herein relates to an integrated circuit, and more particularly, to an integrated circuit including an active shield.

BACKGROUND

In integrated circuits, particularly in their use in smart cards, it is possible for a potential attacker to perform an analysis of the integrated circuit (IC), so-called "reverse engineering", and to use the obtained information either to alter an operation mode of the circuit or to perform a data manipulation in the memory thereof. The process can lead to undesirable consequences particularly in the case of security-relevant circuits, for instance, various cash cards or access authorization functions.

An active shield can protect the IC. However, an attacker may try to avoid the active shield of the IC using a Focused Ion Beam (FIB) method, a probing method, or a forcing method to hack the IC. The FIB method can arbitrarily cut or connect metal lines. The probing method can cut a specific metal line of the active shield using the FIB method and read a state value of the cut metal line. The forcing method can cut a specific metal line of the active shield using the FIB method and provide a specific signal to the cut metal line to manipulate data.

SUMMARY

Embodiments of the present invention provide ICs including an active shield configured to receive a test signal, and configured to output a plurality of shield signals, derived from the test signal, via a plurality of signal paths, a compare logic configured to compare the test signal with each of the plurality of shield signals to provide at least two comparison signals indicating comparison results and configured to output the at least two comparison signals, and a detection and decision logic configured to determine whether the active shield is subject to attack based on patterns of the at least two comparison signals.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DESCRIPTION OF EMBODIMENTS ACCORDING TO THE INVENTION

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that terms, such as Logic, Controller, etc. used to describe elements shown in blocks of the Figures are used in reference to logical functions which can refer to structural elements, such as circuits. Accordingly, these functional terms will be understood to also refer to the elements embodied in a structural circuit.

An integrated circuit (IC) according to the present invention can include: an active shield receiving a test signal, and outputting a plurality of shield signals through a plurality of signal paths; a compare logic comparing the test signal with each of the plurality of shield signals to output at least two comparison signals depending on comparison results; and a detection and decision logic determining whether the active shield is attacked or not according to each of patterns of the at least two comparison signals.

It will be understood that, as used herein, the term "active shield" includes lines configured near circuits to be protected from attack. In particular, an active shield may look similar to a network of lines covering all or part of the circuit to be protected. If a line or part of the shield is removed, severed or short-circuited to another line, the breach may be detected, whereupon the chip may halt some or all functions.

Figure 1:
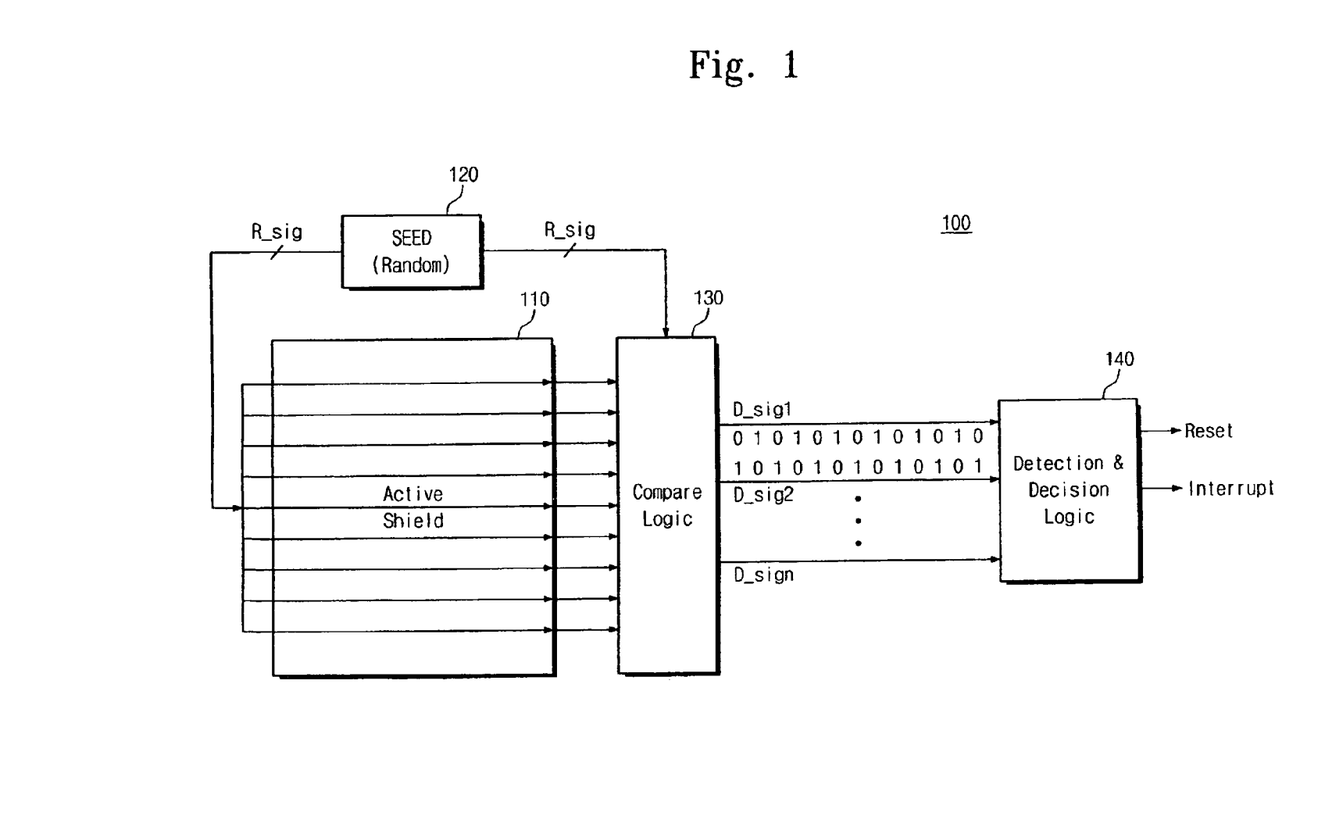
FIG. 1 is a block diagram of an IC according to a first embodiment of the present invention.

FIG. 1 is a block diagram of an IC according to a first embodiment of the present invention. Referring to FIG. 1, an IC 100 includes an active shield 110, a seed 120, a compare logic 130, and a detection and decision logic 140.

The active shield 110 is a metal line for protecting the IC 100 against an external attacker who attempts an analysis of the IC, so-called "reverse engineering". The seed 120 generates randomized data. The seed 120 transfers the same random data R_sig to the active shield 110 and the compare logic 130. The compare logic 130 compares the random data R_sig transferred from the seed 120 with data transferred from the active shield 110. If the random data R_sig transferred from the seed 120 and the data transferred from the active shield 110 are the same, the compare logic 130 outputs a toggled first comparison signal D_sig1 and a second comparison signal D_sig2 inverting the first comparison signal D_sig1. If not, the compare logic 130 outputs the toggled first comparison signal D_sig1 and the second comparison signal D_sig2 identical to the first comparison signal D_sig1.

The compare logic 130 is configured to output two or more comparison signals. Embodiments of an IC according to the present invention can include the two or more comparison signals to make it more difficult for a hacker to attack the IC using an FIB method, a probing method, and/or a forcing method.

The detection and decision logic 140 detects and processes the first and second comparison signals D_sig1 and D_sig2 received from the compare logic 130. If the first and second comparison signals D_sig1 and D_sig2 are complementary to each other, the active shield 110 is in a stable state. Hence, the detection and decision logic 140 does not operate. In other words, if the first and second comparison signals D_sig1 and D_sig2 are complementary to each other, the outputs of the active shield 110 are nominal. On the other hand, if the attacker attacks the active shield 110, the detection and decision logic 140 generates a reset signal Reset that initializes the IC 100 or an interrupt signal Interrupt that interrupts functions of the IC 100.

Figure 2:
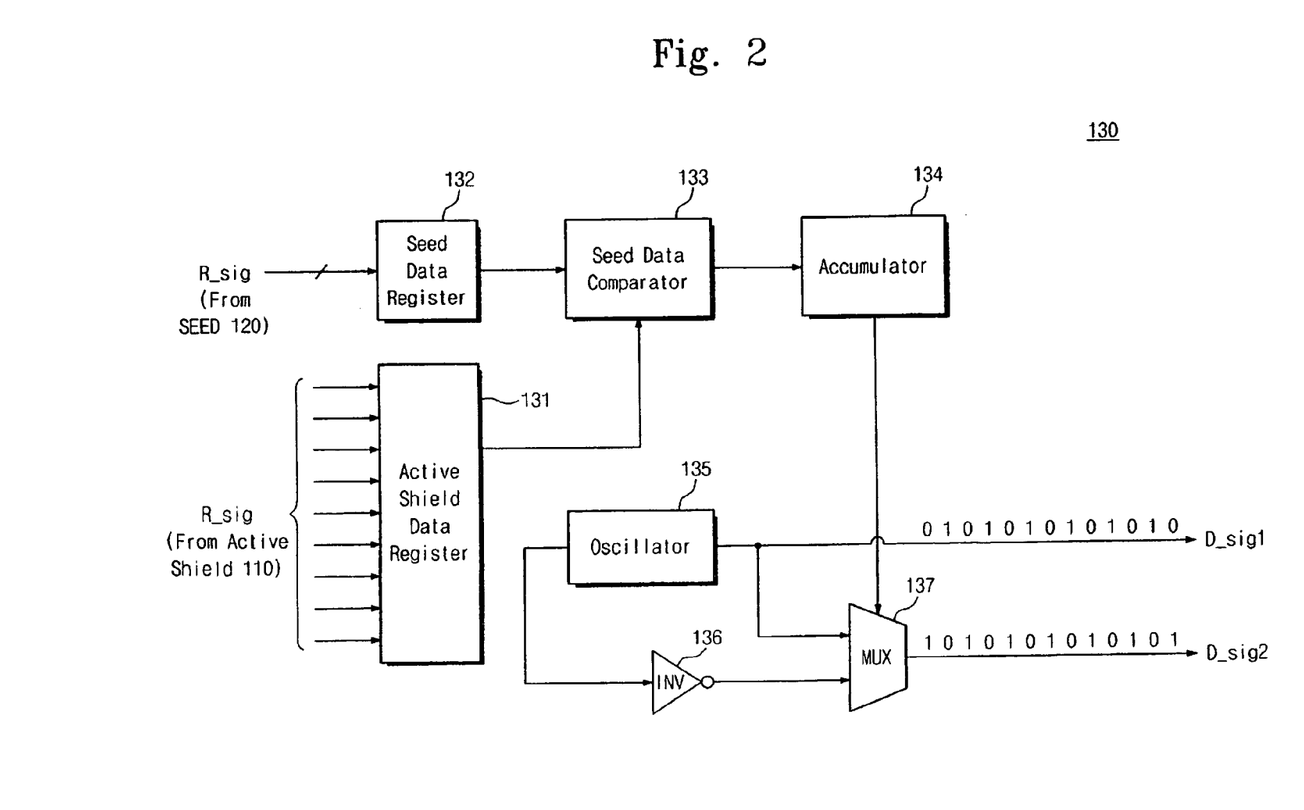
FIG. 2 is a block diagram illustrating internal blocks of a compare logic illustrated in FIG. 1.
Figure 3:
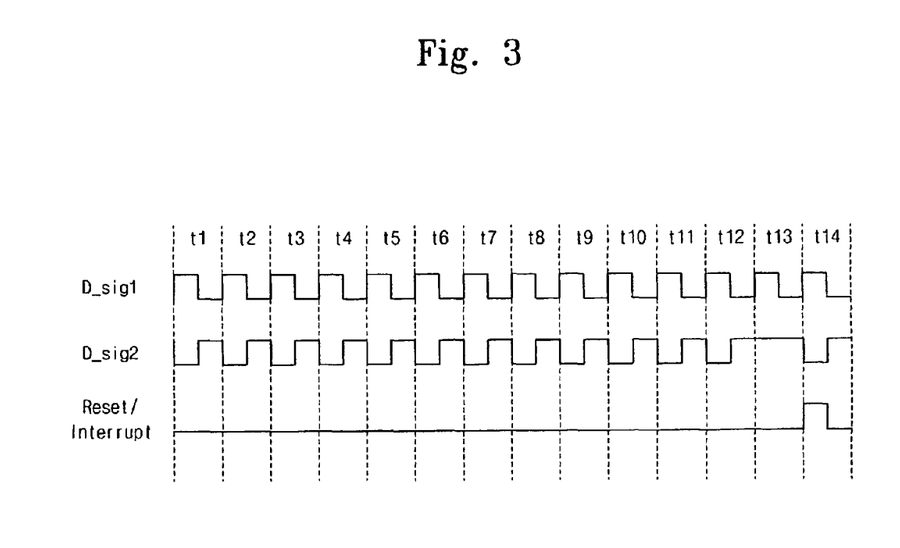
FIG. 3 is a timing diagram of the compare logic of FIG. 1.

Internal blocks of the compare logic 130 will be described in detail with reference to FIGS. 2 and 3. FIG. 2 is a block diagram illustrating internal blocks of the compare logic 130 illustrated in FIG. 1, and FIG. 3 is a timing diagram of the compare logic 130 of FIG. 1. Referring to FIG. 2, the compare logic 130 includes an active shield data register 131, a seed data register 132, a seed data comparator 133, an accumulator 134, an oscillator 135, an inverter 136, and a multiplexor (MUX) 137.

The active shield data register 131 stores data received from the active shield 110. The seed data register 132 stores the random data R_sig received from the seed 120. The seed data comparator 133 compares the data stored in the active shield data register 131 with the data stored in the seed data register 132. If the data stored in the active shield data register 131 and the data stored in the seed data register 132 are the same, the seed data comparator 133 outputs a logic value "0" to the accumulator 134. If not, the seed data comparator 133 outputs a logic value "1" to the accumulator 134. The accumulator 134 stores the comparison results received from the seed data comparator 133. For example, the accumulator 134 stores the logic value "1" when the logic value "1" is input as the comparison result of the seed data comparator 133 after storing the logic value "0". Thereafter, the accumulator 134 maintains the logic value "1" even if a subsequent logic value "0" is input as the comparison result of the seed data comparator 133.

The oscillator 135 generates a toggled signal. The inverter 136 receives and inverts the signal toggled from the oscillator 135. The MUX 137 outputs one of output signals of the oscillator 135 and the inverter 136 in response to a control of the accumulator 134.

Referring to FIGS. 1 through 3, the first comparison signal D_sig1 of the compare logic 130 is toggled according to change of time during a period from time t1 to time t2. The inverter 136 inverts the first comparison signal D_sig1 to output the second comparison signal D_sig2. This means that the IC is not attacked from the attacker. The first comparison signal D_sig1 and the second comparison signal D_sig2 have the same state value at a time t13. This means that the IC is attacked from the attacker. Thus, the detection and decision logic 140 activates the reset signal Reset or the interrupt signal Interrupt at a time t14.

Figure 4:
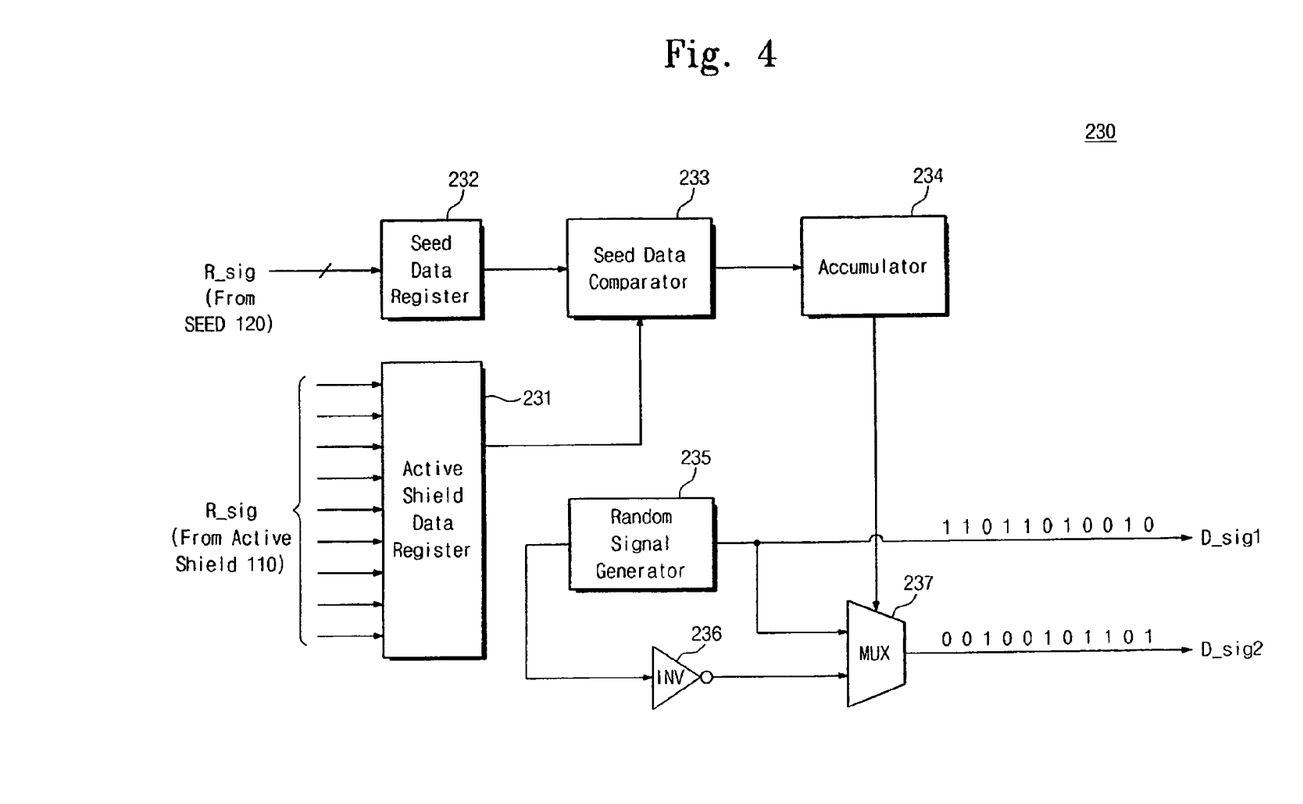
FIG. 4 is a block diagram illustrating internal blocks of a compare logic illustrated in FIG. 1 according to another embodiment of the present invention.
Figure 5:
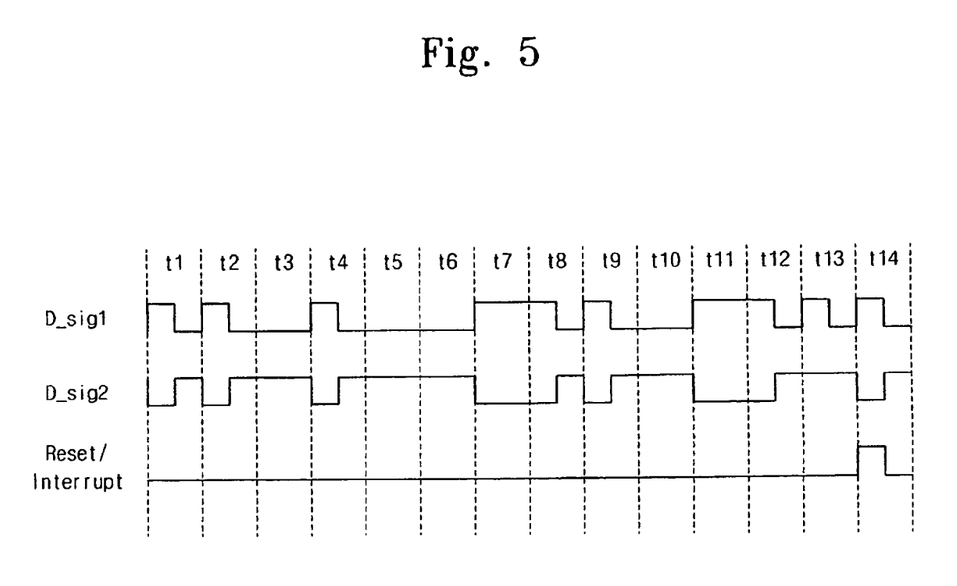
FIG. 5 is a timing diagram of the compare logic of FIG. 1 according to another embodiment of the present invention.

FIG. 4 is a block diagram illustrating internal blocks of a compare logic illustrated in FIG. 1 according to another embodiment of the present invention, and FIG. 5 is a timing diagram of the compare logic of FIG. 1 according to another embodiment of the present invention.

A fundamental structure of FIG. 4 is identical to that of FIG. 2 except the compare logic 130 and the oscillator 135. That is, a compare logic 230 of FIG. 4 includes a random signal generator 235 in place of the oscillator 135. Thus, overlapping explanations will be omitted.

Referring to FIG. 4, the compare logic 230 includes an active shield data register 231, a seed data register 232, a seed data comparator 233, an accumulator 234, a random signal generator 235, an inverter 236, and a MUX 237.

The random signal generator 235 generates a randomized signal. The inverter 236 inverts the random signal received from the random signal generator 235. The MUX 237 outputs one of output signals of the oscillator 235 and the inverter 236 in response to a control of the accumulator 234.

Referring to FIGS. 1, 4, and 5, the first comparison signal D_sig1 of the compare logic 230 is randomly varied according to change of time during a period from time t1 to time t2. The inverter 236 inverts the first comparison signal D_sig1 to output the second comparison signal D_sig2, which indicates that the IC is not subject to attack. In contrast, when the first comparison signal D_sig1 and the second comparison signal D_sig2 have the same state value at a time t13, this indicates that the IC is under attack. Thus, the detection and decision logic 140 activates the reset signal Reset or the interrupt signal Interrupt at a time t14.

Figure 6:
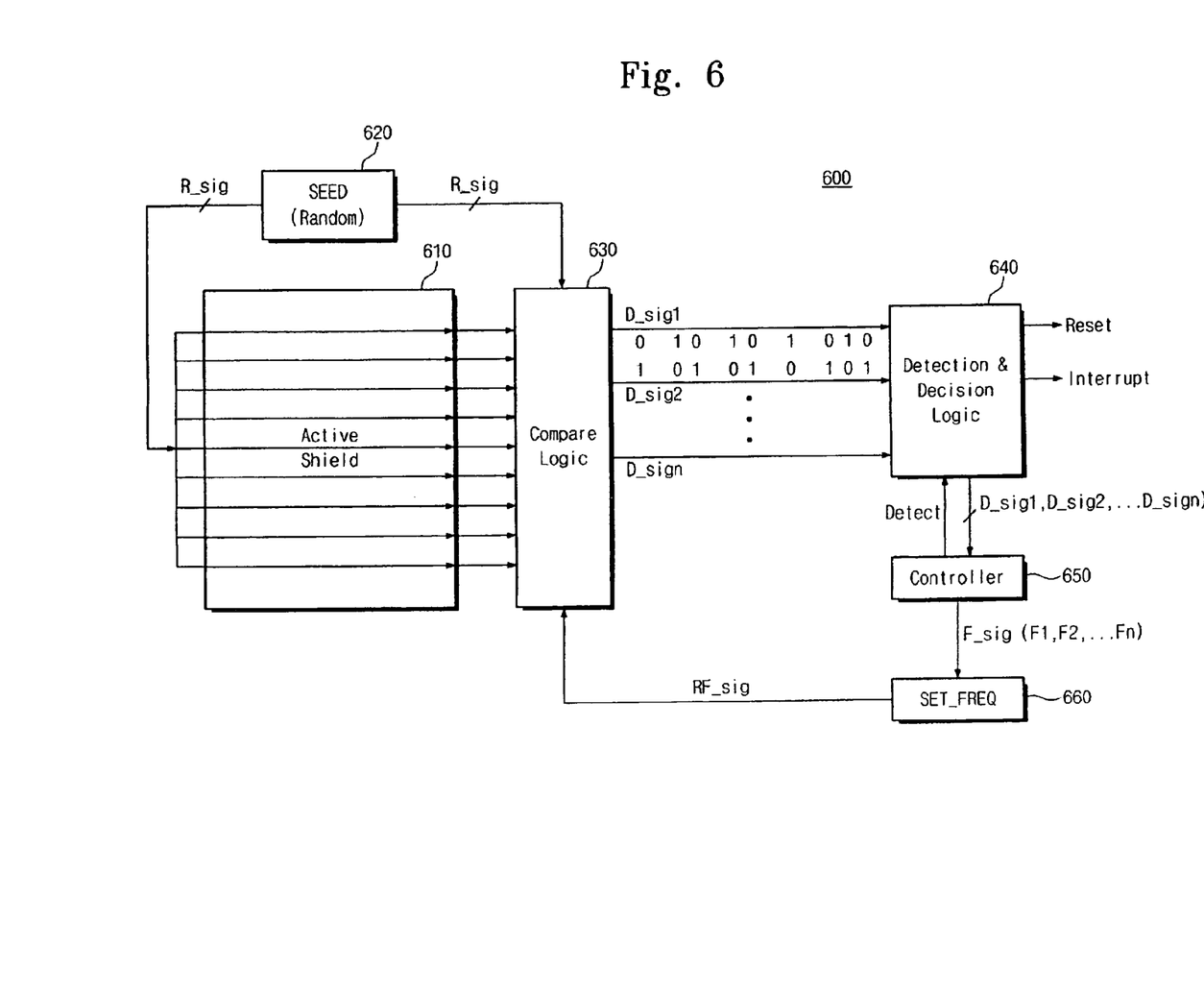
FIG. 6 is a block diagram of an IC according to a second embodiment of the present invention.
Figure 7:
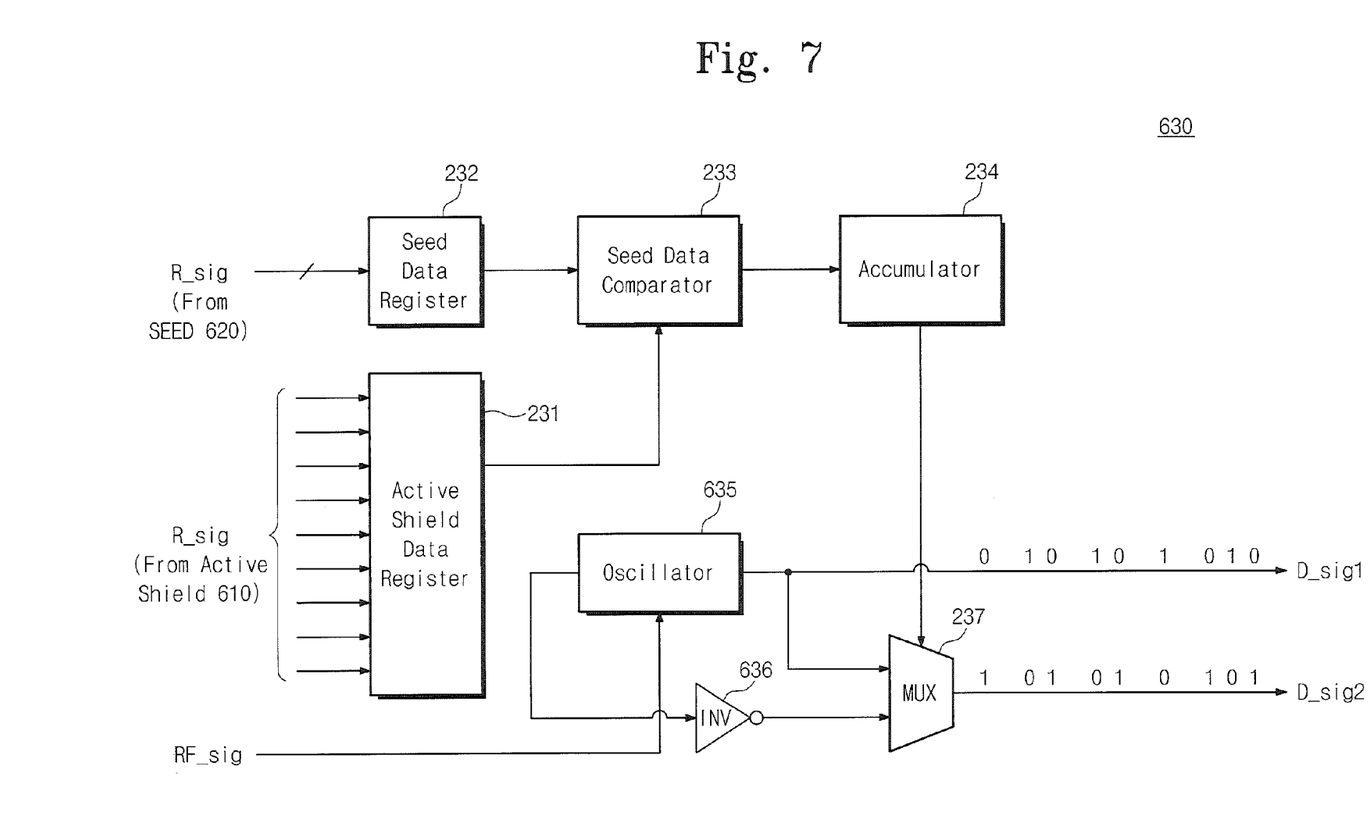
FIG. 7 is a block diagram illustrating internal blocks of a compare logic illustrated in FIG. 6.

FIG. 6 is a block diagram of an IC according to a second embodiment of the present invention, and FIG. 7 is a block diagram illustrating internal blocks of a compare logic illustrated in FIG. 6. A fundamental structure of FIG. 7 is identical to that of FIG. 2 except the oscillator 135. FIG. 7 differs from FIG. 2 in that an oscillator 635 of a compare logic 630 of FIG. 7 further receives a random frequency signal RF_sig received from a frequency set. Thus, overlapping explanations will be omitted. An IC 600 according to the present invention may detect a hacking attempt using hardware and/or software detection methods.

Referring to FIG. 6, the IC 600 includes an active shield 610, a seed 620, a compare logic 630, a detection and decision logic 640, a controller 650, and a frequency set (SET_FREQ) 660.

The active shield 610 is a metal line for protecting the IC 600 against an external attacker who attempts an analysis of the IC, so-called "reverse engineering". The seed 620 generates randomized data. The seed 620 transfers the same random data R_sig to the active shield 610 and the compare logic 630. The compare logic 630 compares the random data R_sig transferred from the seed 620 with data transferred from the active shield 610. If the random data R_sig transferred from the seed 620 and the data transferred from the active shield 610 are the same, the compare logic 630 outputs a first comparison signal D_sig1 having a random period by the random frequency signal RF_sig received from the frequency set 660 and a second comparison signal D_sig2 inverting the first comparison signal D_sig1. If not, the compare logic 630 outputs the first comparison signal D_sig1 and the second comparison signal D_sig2 identical to the first comparison signal D_sig1. The compare logic 620 is designed to output two or more comparison signals (i.e., signal D_sign). The IC according to the present invention includes the two or more comparison signals to make it difficult for the attacker to attack the IC using a FIB method, a probing method, and a forcing method.

The detection and decision logic 640 uses a hardware detection method. The detection and decision logic 640 detects and processes the first and second comparison signals D_sig1 and D_sig2 received from the compare logic 630. For example, the first comparison signal D_sig1 is a toggled signal such as a clock signal, or a randomized signal. The second comparison signal D_sig2 is complementary (inverted) to the first comparison signal D_sig1 when the active shield 610 is in a stable state. If the first and second comparison signals D_sig1 and D_sig2 are complementary to each other, the active shield 610 is in a stable state. Hence, the detection and decision logic 640 does not indicate an attack. On the other hand, if the attacker attacks the active shield 610, the detection and decision logic 640 generates a reset signal Reset that initializes the IC 600 or an interrupt signal Interrupt that interrupts functions of the IC 600.

The controller 650 uses a software detection method. The frequency set 660 outputs the random frequency signal RF_sig to the compare logic 630 in response to a frequency control signal F_sig of the controller 650. For example, the frequency set 660 sets frequencies to about 25 MHz, about 50 MHz, about 75 MHz, etc in response to the frequency control signal F_sig of the controller 650. That is, the frequency set 660 outputs the random frequency signal RF_sig to the compare logic 630 in response to the frequency control signal F_sig. The controller 650 outputs the frequency control signal F_sig such that the frequency set 660 generates the randomized signal. The controller 650 receives the first and second comparison signals D_sig1 and D_sig2 from the detection and decision logic 640. The controller 650 compares a period of the first and second comparison signals D_sig1 and D_sig2 with the frequency control signal F_sig. As a result, when the comparison results do not match each other, the controller 650 activates a detection signal Detect to output the activated detection signal Detect to the detection and decision logic 640. If the detection signal Detect is activated by the controller 650, the detection and decision logic 640 generates the reset signal Reset that initializes the IC 600 or the interrupt signal Interrupt that interrupts functions of the IC 600. If not, the active shield 610 is in a stable state. Hence, the detection and decision logic 640 does not operate.

Figure 8:
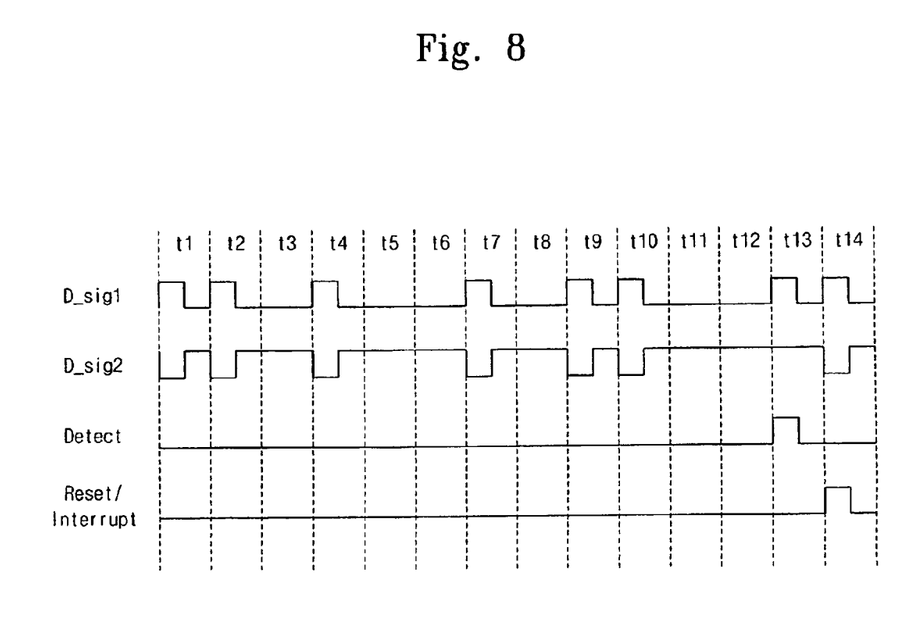
FIG. 8 is a timing diagram of the IC illustrated in FIG. 6.

FIG. 8 is a timing diagram of the IC illustrated in FIG. 6. Referring to FIGS. 6 through 8, it is assumed that the first comparison signal D_sig1 is the toggled signal such as the clock signal. The second comparison signal D_sig2 maintains a complementary state relative to the first comparison signal D_sig1 in case that the active shield 610 is in a stable state. The first comparison signal D_sig1 of the compare logic 630 is randomly varied according to change of time during a period from time t1 to time t2 in response to the random frequency signal RF_sig of the frequency set 660. The inverter 636 inverts the first comparison signal D_sig1 to output the second comparison signal D_sig2. This means that the IC is not attacked from the attacker. The first comparison signal D_sig1 and the second comparison signal D_sig2 have the same state value, i.e., a logic level "1", at a time t13. This means that the IC is attacked from the attacker. Thus, the detection and decision logic 640 activates the reset signal Reset or the interrupt signal Interrupt at a time t14.

Therefore, the IC 600 according to the present invention inputs continuously varying signals to the plurality of comparison signals to prevent hacking from the attacker. In addition, the IC 600 continuously varies the plurality of comparison signals to change periods thereof, thereby preventing the hacking from the attacker.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed:

1. An integrated circuit comprising:
   an active shield for detecting an unwanted attack configured to receive a test signal, and configured to output a plurality of shield signals, derived from the test signal, via a plurality of signal paths;
   a compare logic configured to compare the test signal with each of the plurality of shield signals to provide at least two comparison signals having randomly varying periods indicating comparison results and configured to output the at least two comparison signals as complements of one another when the test signal and each of the plurality of shield signals match; and
   a detection and decision logic configured to determine whether the active shield is subject to attack based on patterns of the at least two comparison signals,
   wherein the detection and decision logic compares the patterns of the at least two comparison signals to output a detection signal indicating whether the active shield is attacked or not depending on the comparison results.

2. The integrated circuit of claim 1, wherein the integrated circuit is reset when the detection signal is activated.

3. An integrated circuit comprising:
   a controller circuit;
   a plurality of comparison signals indicating a security condition associated with an active shield;
   a detection and decision logic configured to receive the plurality of comparison signals; and
   a period controller configured to generate randomly varying periods of the plurality of comparison signals in response to control of the controller,
   wherein the detection and decision logic is configured to receive the plurality of comparison signals and is configured to determine whether the active shield is under attack and output a reset signal or an interrupt signal when the active shield is attacked,
   wherein further comprising a compare logic outputting the plurality of comparison signals,
   wherein the compare logic receives a randomized period signal from the period controller to output the plurality of comparison signals having a randomized period.

4. The integrated circuit of claim 3, wherein the controller receives the plurality of comparison signals from the detection and decision logic and determines the periods of the plurality of comparison signals to detect whether the active shield is attacked from outside, the controller outputting a detection signal to the detection and decision logic when the active shield is attacked from the outside.

5. The integrated circuit of claim 3, wherein the compare logic comprises:
   a seed generating a random signal;
   an accumulator comparing the random signal with an output signal of the active shield receiving the random signal to accumulate a comparison result; and an output outputting the plurality of comparison signals in response to the comparison result of the accumulator.

6. The integrated circuit of claim 3, wherein the plurality of comparison signals comprises:

a first comparison signal alternately repeating a logic value "0" and a logic value "1"; and a second comparison signal complementary to the first comparison signal.

7. The integrated circuit of claim 3, wherein the plurality of comparison signals comprises:

a first comparison signal randomly including a logic value "0" or a logic value "1"; and a second comparison signal complementary to the first comparison signal.

8. The integrated circuit of claim 3, wherein the reset signal initializes the integrated circuit.

9. The integrated circuit of claim 3, wherein the interrupt signal stops a normal operation and informs the integrated circuit about an external attack.

* * * * *